March 6, 1956 C. R. DEMING 2,737,547

CATHODE FOLLOWER CIRCUITS

Filed Oct. 1, 1952

INVENTOR.
CHARLES R. DEMING,
BY Nicholas T Volk
his ATTORNEY.

United States Patent Office
2,737,547
Patented Mar. 6, 1956

2,737,547

CATHODE FOLLOWER CIRCUITS

Charles R. Deming, Venice, Calif., assignor, by mesne assignments, to Hughes Aircraft Company, a corporation of Delaware Application October 1, 1952, Serial No. 312,581
10 Claims. (Cl. 179—171)

This invention relates to cathode follower circuits and, more particularly, to cathode follower circuits including a variable cathode load which is varied in accordance with the magnitude of the signal differential between an applied input signal and the output signal resulting therefrom.

Cathode follower circuits are negative feedback devices generally utilized for driving low impedance loads from high impedance signal sources. In general, the output load of these circuits may be either resistive or capacitive or a combination of both. A capacitive reactance in the load may, of course, be due to a fixed capacitor or may be composed of the stray or wiring capacitance of a resistive load. Ideally, the waveform of the output signal from a cathode follower conforms with the waveform of an applied input signal for all frequency components of the input signal. In practice, however, conventional cathode follower circuits reproduce applied signals at only reasonably low frequencies, since the charge or discharge time-delay of the load capacitance becomes appreciable at relatively high frequencies and results in distorted output signals. In addition, conventional cathode followers provide a satisfactory linear variation between their input and output signals only when the applied signal is positive or slightly negative with respect to the quiescent potential of the grid of the cathode follower tube. In other words, negative input signals of relatively low magnitude may decrease the conduction of the cathode follower tube to a point whereat its amplification factor $\mu$, which is a function of the current through the tube, decreases rapidly and thus prevents faithful reproduction of the applied signal due to a decrease in the voltage gain of the cathode follower circuit. In order to permit even reasonably accurate reproduction of a negative signal, such as an applied negative direct-current potential, it is necessary to operate the conventional cathode follower circuit with relatively large power drain in the quiescent state.

In order to prevent distortion, due to large negative signals or high frequency signals, from appearing in the output signal from the cathode follower, it is necessary to vary the cathode load in accordance with the instantaneous magnitude of the input signal. Thus, if a negative-going signal having high frequency components is applied to the cathode follower circuit, the cathode load impedance is decreased to enable the capacitor in the output load to discharge more rapidly and thereby follow the input signal. If, on the other hand, a negative direct-current potential is applied to the cathode follower circuit, the decrease in impedance of the cathode load may be utilized to counteract the decrease in gain of the circuit which would otherwise result from a decrease in the amplification factor $\mu$ or the transconductance $g_m$ of the cathode follower tube due to decreased tube conduction.

One cathode follower circuit of the prior art which has been utilized for obtaining improved high frequency response employs an electron discharge tube as a variable load in the cathode circuit and an impedance in the plate circuit of the cathode follower tube. A control signal, which is developed in the plate circuit, varies in accordance with the rising or falling input signal and is applied to a control electrode of the variable load tube in order to vary the load impedance in accordance with the applied signal.

As a result of the plate circuit impedance, this prior art circuit has several inherent disadvantages. For example, current flow through the impedance produces a power loss which reduces the circuit efficiency. Furthermore, the anode load impedance introduces a delay in charging the output capacitor thereby limiting the ability of the circuit to rapidly follow rising input signals. A further disadvantage of this circuit is that the cathode follower tube must be operated on the straight line portion of its characteristic curve in order to reproduce both positive and negative signals.

Another circuit of the prior art for preventing output distortion at high frequencies is illustrated in U. S. patent, Serial No. 2,488,567, issued November 22, 1949, to E. K. Stodola for "Electron Tube Power Output Circuit for Low Impedance Loads." In this circuit a cathode follower tube has an electron discharge tube as the cathode load. Input signals are first preamplified and then converted into two out-of-phase signals which are applied to the cathode follower tube and the cathode load tube, respectively. Accordingly, the impedance of both the cathode follower tube and the cathode load tube vary in accordance with rising or falling input signals, but only the cathode follower tube has negative feedback.

One disadvantage of this prior art circuit is the necessity of a preamplifying stage and the accompanying distortion and frequency limitations introduced by this stage. Another disadvantage is that the magnitude of the control signal is not controlled automatically in accordance with the output signal. As a result, the circuit cannot provide any negative feedback for the cathode load tube.

The cathode follower circuits of the present invention overcome the above and other disadvantages of the prior art by including a variable impedance cathode load tube and means for varying the cathode load impedance in accordance with the signal differential between the input and output signals. In other words, according to the basic concept of this invention, negative feedback is applied to both the cathode follower tube and the cathode load tube, thus faithfully reproducing both positive and negative signals at frequencies from zero to relatively high values. In addition, the gain of the cathode follower circuit is made substantially independent of changes in the amplification factor $\mu$ of the cathode follower tube and the load tube.

More particularly, the cathode follower circuits of the present invention comprise a cathode follower tube, an electron discharge load tube in the cathode circuit of the cathode follower tube, and a control circuit including an electron discharge control tube responsive to the signal differential between the input and output signals of the circuit for varying the plate impedance of the load tube or, in other words, for providing negative feedback to the load tube.

According to one embodiment of the present invention, a cathode follower circuit is disclosed which may be utilized for faithfully reproducing relatively high frequency input signals which have both positive and negative excursions. In this circuit the control tube has a grid or control electrode connected to the control electrode of the cathode follower tube for receiving the input signal, a cathode connected to the output terminal of the circuit for receiving the output signal, and an anode connected by an anode load impedance to a source of direct-current potential. The signal developed across the anode load impedance is applied, as negative feedback, through a coupling capacitor to the control electrode of the load tube.

According to another embodiment of this invention, the grid of the control tube is again connected to the grid or control electrode of the cathode follower tube and the anode is connected to a source of anode potential through an anode load impedance. In this embodiment, however, the cathode of the control tube is connected to the output of a conventional cathode follower whose input circuit is connected across the output terminals of the cathode follower circuit of this invention. In addition, the signal developed across the anode load impedance of the control tube is direct-current coupled to the grid or control electrode of the control tube. In this manner, faithful reproduction of all positive or negative input signals may be achieved, regardless of whether the input signal is substantially a direct-current potential or has high frequency components.

It is, therefore, an object of this invention to provide a cathode follower circuit in which the output signals faithfully follow the input signals for wide frequency variations including relatively high frequencies.

A further object of this invention is to provide a cathode follower circuit capable of more faithfully reproducing positive and negative input signals.

An additional object of this invention is to provide a cathode follower circuit for faithfully reproducing both positive and negative input signals over a frequency range extending from direct current potentials to relatively high frequencies.

Another object of this invention is to provide a cathode follower circuit having a variable cathode load which varies in accordance with the signal differential between the input and output signals.

Still another object of this invention is to provide a cathode follower circuit having a variable impedance cathode load tube responsive to a signal differential between the input and output signals for changing the impedance of the cathode load to make the output signal follow the input signal.

It is an additional object of this invention to provide cathode follower circuits having a variable impedance cathode load and means for applying negative feedback to the cathode load in accordance with the signal differential between the input and output signals.

Another object of this invention is to provide a cathode follower circuit including a cathode follower tube and a variable impedance load tube which are responsive to signal differentials between the input and output signals for positive and negative signals, respectively, for producing an output signal which conforms to the input signal over a wide range of frequencies.

A still further object of this invention is to provide a cathode follower circuit having minimum power requirements.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
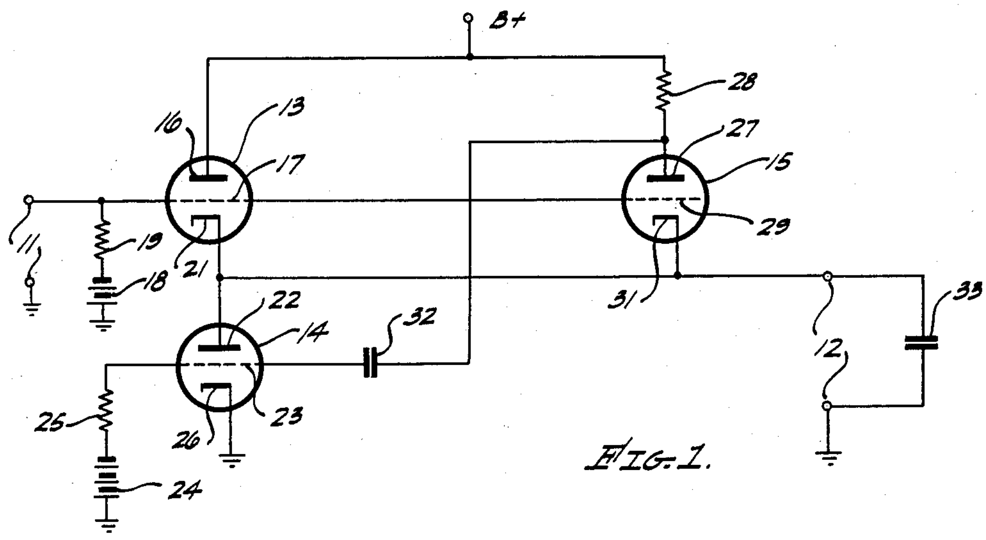
Fig. 1 is a schematic diagram of one embodiment of a cathode follower circuit according to this invention.

Referring now to the drawings, there is shown in Fig. 1 one embodiment of a cathode follower circuit according to this invention for applying both positive and negative excursions of an alternating-current input signal appearing at a pair of input terminals 11 to a pair of output terminals 12, one terminal of each pair being grounded. As shown in Fig. 1, the cathode follower circuit includes a cathode follower tube 13, a variable cathode load, such as an electron discharge tube 14, and a control tube 15 for controlling the impedance of cathode load tube 14 in accordance with the signal differential between the input and the output signals of the circuit.

Cathode follower tube 13 includes an anode 16 connected to the B+ terminal of a source of direct-current potential, not shown, a control electrode 17 connected to ungrounded input terminal 11, and to a conventional biasing source including a battery 18 and a resistor 19, and a cathode 21 connected to ungrounded output terminal 12. Cathode load tube 14 includes an anode 22 connected to cathode 21 of cathode follower tube 13, a control electrode 23 connected to a biasing source including a battery 24 and a resistor 25, and a cathode 26 connected to ground. Control tube 15 includes an anode 27 connected to the B+ terminal through an anode resistor 28, a control electrode 29 connected to control electrode 17 and to ungrounded input terminal 11, and a cathode 31 connected to cathode 21 and to ungrounded output terminal 12.

Anode 27 of control tube 15 is alternating current coupled to control electrode 23 of variable load tube 14 by means of a coupling capacitor 32 in order to control the impedance of variable load tube 14. In addition, for the purpose of clarifying the description which follows, a conventional load capacitor 33 is indicated as being coupled across output terminals 12. It is to be understood, of course, that capacitor 33 may be a fixed capacitor or may be the input capacitance of an output load circuit.

Figure 2:
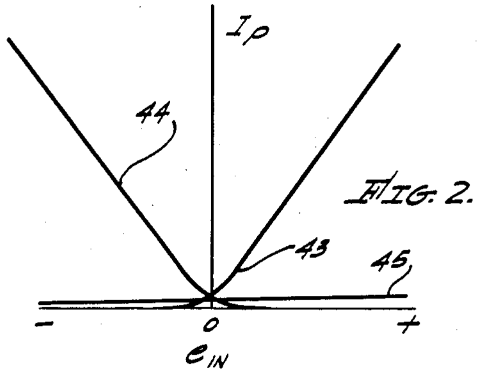
Fig. 2 is a set of operating curves of the electron discharge tubes of Fig. 1 for one mode of operation.

In operation, it will be assumed first that tubes 13 and 14 are biased at approximately cutoff in order to limit the current drain from the direct-current power supply. This mode of operation is illustrated in Fig. 2, wherein curves 43, 44, and 45 are the control voltage-plate current characteristics of tubes 13, 14, and 15, respectively. As shown in Fig. 2, a positive input signal increases the conduction of cathode follower tube 13 and drives load tube 14 toward cutoff, while a negative input signal increases the conduction of load tube 14 but drives cathode follower tube 13 toward cutoff. It will be recognized by those skilled in the art that the curves for tubes 13 and 14 represent substantially class B operation and, therefore, provide excellent power economy in the quiescent state. On the other hand, control tube 15 remains conducting for both positive and negative input signals and is preferably operated class A or class AB. In addition, it is clear that in the absence of an input signal at input terminals 11, the quiescent operating state of the cathode follower circuit is such that the potential across capacitor 33 is at a predetermined value between ground potential and the potential at terminal B+.

Consider now the dynamic operation of the circuit of Fig. 1 for the mode of operation illustrated in Fig. 2. In the quiescent state, a portion of the current flowing through cathode folower tube 13 also flows as a load current through load tube 14. In order to clearly set forth the many advantages of the circuit shown in Fig. 1, the effect of control tube 15 on the operation of the circuit will be completely neglected momentarily, and it will be assumed that a falling or negative going signal having a relatively steep slope corresponding to high frequency components is applied to input terminals 11. It is clear then that cathode follower tube 13 is driven toward cut-off, thereby decreasing its current conduction. It is also apparent, however, that the potential of cathode 21 of follower tube 13 cannot change instantaneously since the potential across capacitor 33 is inherently limited from changing instantaneously.

Accordingly, if the effect of control tube 15 is neglected, the instantaneous negative signal applied to the grid of the cathode follower tube will not instantaneously change the potential across load tube 14. It follows then that load tube 14 will instantaneously continue to conduct the same current as it did in the quiescent state. On the other hand, since the conduction of cathode follower tube 13 has been decreased, a portion of the current through load tube 14 will be supplied from capacitor 33 which instantaneously starts to discharge through the load tube. It is, therefore, seen that the output signal of the circuit of Fig. 1 will tend to follow the applied negative-going input signal.

By neglecting completely the effect of control tube 15 on the cathode follower circuit of the present invention, the behavior and function of load tube 14 is effectively that of a fixed resistor cathode load in a conventional cathode follower circuit. Accordingly, the ability of the circuit to reproduce faithfully a negative-going input signal is inherently limited by the RC exponential discharge curve of capacitor 33 through the impedance of the load tube. In other words, if the slope of the negative-going input signal exceeds the slope of the discharge curve for capacitor 33, the output signal will only tend to follow the input signal. Stated differently, if the frequency of the input signal is relatively high with respect to the discharge rate of capacitor 33, the output signal of the circuit will be unable to follow the input signal.

Consider the effect of control tube 15 on the cathode follower circuit shown in Fig. 1, neglecting the connection of the cathode of the control tube to anode 22 of load tube 14. As the negative-going signal is applied instantaneously to input terminals 11, control tube 15 is instantaneously biased negatively with respect to its quiescent grid potential in accordance with the instantaneous amplitude of the applied signal. Accordingly, its conduction is decreased, thereby decreasing the potential difference across anode resistor 28 and raising the potential of anode 27. The change in potential at anode 27 is in turn applied to control electrode 23 of load tube 14, thereby increasing its conductance or, in other words, effectively decreasing the impedance in the discharge path of capacitor 33. It is clear, therefore, that the impedance offered by load tube 14 to the discharge of capacitor 33 is a function of the instantaneous amplitude of the applied negative-going input signal. In addition, it is apparent that a decrease in the impedance, or an increase in the conductance, of load tube 14 will permit a more rapid discharge of capacitor 33, thereby tending to make the output signal appearing at output terminals 12 follow more closely the input signal potential variations.

In the description thus far presented of the cathode follower circuit of the present invention, it has been shown how the input signal alone may be utilized for varying the impedance of the load tube to tend to make the output signal appearing at output terminals 12 follow the input signal. However, if the impedance of the load tube is varied merely in accordance with the amplitude of the input signal, the ability of the output signal to accurately follow the input signal is still limited by the maximum slope of the discharge characteristic of capacitor 33. For example, in a variable load cathode follower circuit where the variation in the load tube is purely a function of the input signal, the output signal may satisfactorily follow the input signal provided that the instantaneous slope of the input signal is less than the maximum slope of the RC discharge transient in the output circuit. If the capacitance of the load, or the frequency of the input signal is increased to a value at which the instantaneous slope of the input signal is greater than the slope of the discharge transient, the output signal will tend to follow the input signal but will lag the input signal in time relationship.

The cathode follower circuit of this invention shown in Fig. 1, on the other hand, includes a connection between cathode 31 of the control tube and the ungrounded output terminal, thereby providing an extremely advantageous self-balancing or negative feedback feature for varying the impedance of load tube 14 not as a function of the input signal alone, but as a function of the signal differential existing between the amplitudes of the input signal applied at terminals 11 and the output signal presented at terminals 12.

If it is now assumed that a negative-going signal having a relatively steep slope or, in other words, having components of relatively high frequency, is applied at input terminals 11, the impedance or transconductance of load tube 14 will again be varied instantaneously to permit capacitor 33 to discharge rapidly. Let us further assume that the normal slope of the discharge transient of capacitor 33 is not as steep as the slope of the applied signal. It is clear then that a signal differential will arise between the amplitudes of the input and output signals due to the inability of the potential across capacitor 33 to follow satisfactorily the input signal. However, since the output signal from the cathode follower circuit is applied to cathode 31 of control tube 15, it becomes immediately apparent that any signal differential between the input and output signals will effectively drive the grid to cathode potential of control tube 15 even lower, thereby increasing still further the potential at anode 27 and, accordingly, increasing still further the instantaneous potential applied to grid 23 of load tube 14. It follows logically that load tube 14 will now conduct more heavily due to this negative feedback and thus discharge capacitor 33 at a rate which will very nearly make the slope of the discharge transient identical to the relatively steep slope of the applied signal. In this manner extremely fast-acting cathode follower action may be obtained, and relatively precise reproduction of negative input signals may be achieved at frequencies far above those frequencies at which distortion limits the application of prior art cathode follower circuits.

The description set forth above discloses the dynamic operating characteristics of the present invention when a negative-going signal is applied to input terminals 11. As will become clear from the description which follows, however, the dynamic operation of the circuit when a positive-going pulse is applied includes a similar self-balancing feature.

Assume now that a positive-going signal or pulse is applied to input terminals 11. It is immediately clear that cathode follower tube 13 conducts more heavily to further charge capacitor 33 and to tend to raise the potential across output terminals 12 in accordance with the positive-going input signal. In addition, instantaneously upon application of the input signal, the potential at anode 27 of control tube 15 is lowered, thereby driving grid 23 of load tube 14 more negative and consequently driving the load tube toward cutoff. The current decrease of load tube 14 is, in turn, complemented by an equal additional increase in the charging current through capacitor 33, thereby charging capacitor 33 more quickly and tending to make the output signal appearing at output terminals 12 more nearly follow the input signal.

Now let us assume that the slope of the applied signal is instantaneously steeper than the slope of the charging transient of capacitor 33 even though the conduction of load tube 14 has been decreased. When this is the case, a signal differential arises between the input and output signal amplitudes due to the inability of the capacitor to charge as quickly as desired. This signal differential, it is clear, will drive grid 17 of cathode follower tube 13 still further positive with respect to its cathode 21, thereby providing negative feedback to the cathode follower tube in the conventional manner to further increase the charging current through capacitor 33 to make the potential thereacross faithfully follow the input signal.

It is evident, therefore, that the output signal presented at output terminals 12 will faithfully follow the input signal applied at input terminals 11 regardless of whether the input signal is instantaneously negative-going or positive-going.

It should be emphasized that the cathode follower circuits of the present invention apply negative feedback to both the cathode follower tube and the cathode load tube. Furthermore, when these tubes are operated substantially class B, as shown in Fig. 2, the negative feedback to cathode follower tube 13 is most significant when positive input signals are applied, while the negative feedback to load tube 14 is most significant when negative input signals are applied. Since the negative feedback parameter $\beta$ for the cathode follower tube is substantially equal to minus one, it is preferable to make the gain of the control tube circuit equal to one so that the negative feedback applied to load tube 14 during negative input signals is substantially equal to the feedback applied to the cathode follower tube during positive input signals. However, it should be understood that the gain of the control tube circuit may be changed, if desired, in order to amplify signal differentials between the input and output signals before applying the negative feedback to the load tube. Thus, if the output signal should be a fraction of a volt behind the input signal in amplitude, an amplified signal of several volts may be applied to the grid of load tube 14 in order to charge or discharge capacitor 33 more rapidly and thereby make the output signal conform with the input signal. In other words, in the circuit of this invention, any tendency of the output signal to lag the input signal may be overcome virtually instantaneously by the amplifier action of control tube 15.

It is clear, of course, that although the operation of the cathode follower circuit shown in Fig. 1 has been described with tubes 13 and 14 operating substantially class B, other quiescent operating conditions may be selected. For example, it may be desired to operate tubes 13 and 14 on the linear portion of their characteristic curves.

Figure 3:
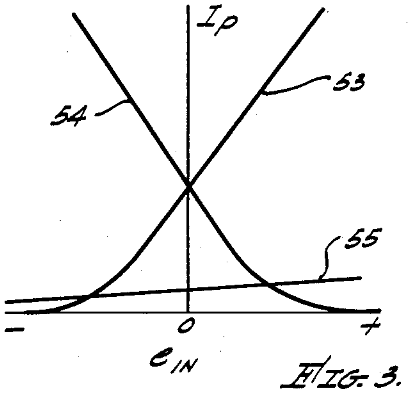
Fig. 3 is a set of operating curves of the electron discharge tubes of Fig. 1 for another mode of operation.

Referring now to Fig. 3, wherein curves 53, 54, and 55 are the control voltage-plate current characteristics of tubes 13, 14, and 15, respectively, there is illustrated a mode of operation wherein tubes 13 and 14 are biased to conduct more heavily in their quiescent operating state. The operation of the cathode follower circuit of Fig. 1 for this mode is similar to the operation previously described in connection with Fig. 2, with the exception that negative feedback is applied to both the cathode follower tube and the load tube simultaneously over a relatively wide range of input signals. However, because of the operational similarity of these two modes, it is considered that further description is unnecessary.

The description of the invention has thus far been limited to disclosing how one embodiment of the cathode follower circuit of the present invention may be utilized with applied alternating-current signals. However, as described below, cathode follower circuits according to the present invention may be utilized for producing output signals which faithfully follow positive or negative signals which have zero frequency components, or in other words, include direct-current potential levels.

Figure 4:
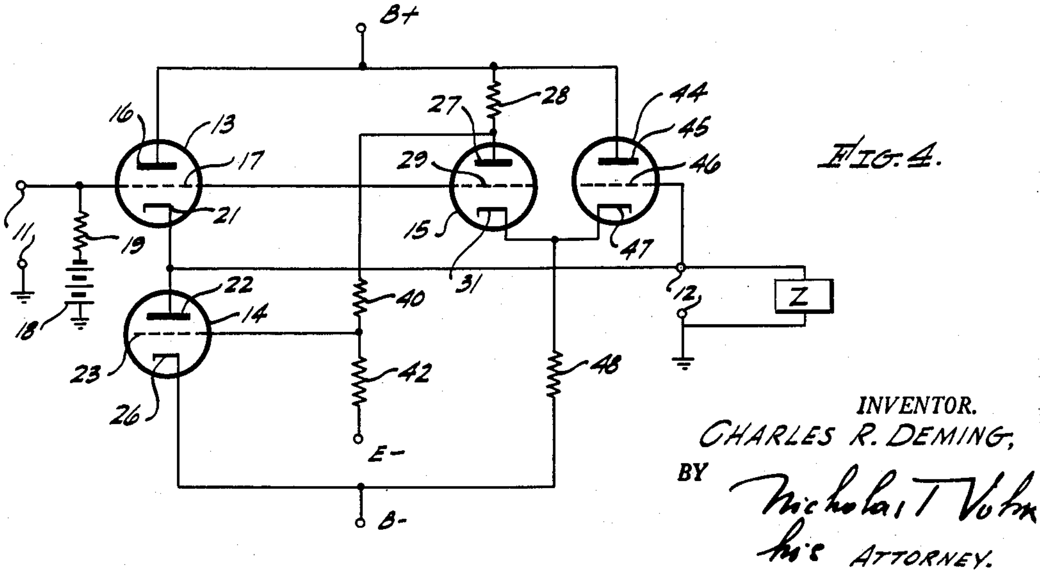
Fig. 4 is a schematic diagram of another embodiment of a cathode follower circuit according to this invention.

Referring now to Fig. 4, there is shown another embodiment of a cathode follower circuit according to this invention for applying both positive and negative signals, including direct-current potentials, appearing at a pair of input terminals 11 to a pair of output terminals 12, one terminal of each pair being grounded. The cathode follower circuit of Fig. 4 is similar to the cathode follower shown in Fig. 1 in that it includes a cathode follower tube 13, a variable impedance cathode load tube 14, and a control tube 15, each having an associated cathode, anode and control grid which are designated by the same reference characters shown in Fig. 1.

The electrical connections to cathode follower tube 13 of Fig. 4 are identical to the corresponding connections shown in Fig. 1 and, therefore, need not be described. Similarly, the connections to the anode of load tube 14 and the anode and grid of control tube 15 remain unchanged. Cathode 26 of load tube 14, however, is connected to one terminal B— of a source of negative potential, not shown, while control electrode 23 is coupled to anode 27 of control tube 15 through a direct-current coupling network which includes two series resistors 40 and 42, respectively, corresponding to the alternating current coupling capacitor 32 shown in Fig. 1. Control electrode 23 is connected to the junction of resistors 40 and 42 while the free ends of these resistors are connected to anode 27 of control tube 15 and to one terminal E— of a source of negative potential, respectively. This source of negative potential, not shown, includes another terminal which is grounded and in addition, supplies a potential at terminal E— which is more negative than the potential at terminal B—.

Cathode 31 of control tube 15 is coupled to ungrounded output terminal 12 by a conventional cathode follower circuit which includes a driving tube 44 having an anode 45, a control electrode 46, and a cathode 47. Anode 45 is connected to terminal B+ of the source of positive potential while control electrode 46 is connected to ungrounded output terminal 12. The cathode of tube 44, on the other hand, is connected to terminal B— through a fixed cathode resistor 48 and is also connected directly to cathode 31 of control tube 15.

Assume now the potentials at terminals B— and B+ are such that the ungrounded output terminal is substantially at ground potential due to the voltage dividing action of cathode follower tube 13 and load tube 14. In addition, it will be assumed that tubes 13 and 14 are again operating near cut-off in their quiescent state, and that an impedance $z$ having a direct current return path is connected across output terminals 12.

Consider now the operation of the circuit of Fig. 4 when a positive signal having a direct-current component is applied at input terminals 11. Cathode follower tube 13 conducts more heavily and increases the current flow through load $z$, thereby increasing the potential at output terminals 12 and tending to make the output signal conform to the input signal. Ordinarily, as in conventional cathode followers, the output signal will very nearly conform to the input signal due to the negative feedback applied to cathode follower tube 13. If, however, the output signal does not faithfully follow the applied positive signal, the signal differential between the input and output signals results in increased conduction through control tube 15 and anode resistor 28. The signal appearing at anode 27 of control tube 15 is then out of phase with respect to the signal differential, and is applied as negative feedback to load tube 14 through the coupling action of resistors 40 and 42 in order to drive load tube 14 toward cut-off and thus increase the current through and the potential across load $z$. In this manner the output signal will be made to conform with the input signal.

Assume now that a negative signal having a negative direct-current component is applied across input terminals 11. Cathode follower tube 31 will now be driven toward cut-off and the current through load tube 14 will be supplied through load $z$, thereby tending to make the output signal follow the negative input signal. If, however, the output signal does not follow the input signal, or in other words, remains more positive than the input signal, the signal differential between the input and output signals is applied to control tube 15 to decrease the current conduction therethrough. Accordingly, the potential appearing at anode 27 of the control tube will increase in magnitude and produce a control signal which is 180° out of phase with the signal differential. The control signal is then applied to load tube 14 as negative feedback to increase its conduction and thus increase the current through load z. It is clear, therefore, that the potential across output terminals 12 will go further negative and conform to the input signal.

The behavior of the circuit shown in Fig. 4 for high frequency signal components of either positive or negative polarity is substantially the same as the previously described operation of the circuit of Fig. 1. Accordingly, it is considered that further discussion of the frequency response of the cathode follower circuit shown in Fig. 4 is unnecessary.

It is to be understood, of course, that drive tube 44 and resistor 48 may be eliminated from the cathode follower circuit shown in Fig. 4 by connecting cathode 31 of control tube 15 directly to the ungrounded output terminal as was shown and described in Fig. 1. The principal advantage in utilizing the combination of drive tube 44 and resistor 48 is that the quiescent current through load z and load tube 14 is made independent of the current through control tube 15. It will also be recognized by those skilled in the art that other forms of coupling devices or networks may be utilized in place of resistors 40 and 42 in Fig. 4 and capacitor 32 in Fig. 1. In addition, it is clear that the potentials shown are for purposes of description only and are not intended to indicate a preferred mode of operation.

It should be understood, of course, that the foregoing disclosure relates to only preferred embodiments of this invention and that numerous modifications may be made therein without departing from the spirit and scope of the invention as set forth in the appended claims.

What is claimed as new is:

1. An electron tube network for producing an electrical output signal corresponding to an applied electrical input signal, said network comprising: a cathode follower tube having an anode, a control electrode for receiving the input signal, and a cathode for presenting the output signal; a variable impedance load for said cathode follower tube including an electron discharge tube having an anode connected to the cathode of said cathode follower tube, a control electrode, and a cathode; a control tube having an anode, a control electrode connected to the control electrode of said cathode follower tube for receiving the input signal, and a cathode coupled to the cathode of said cathode follower tube; means for generating a control signal at the anode of said control tube, said control signal being a function of the signal differential between the output and the input signals; and means for applying said control signal received by the control electrode of said cathode follower tube to the control electrode of said variable load tube whereby the impedance of said variable load tube varies in accordance with the signal differential between the output and the input signals.

2. The electron tube network defined in claim 1 wherein said means includes a capacitor coupling the anode of said control tube to the control electrode of said variable load tube.

3. The electron tube network defined in claim 1 wherein said means is a direct-current coupling network coupling the anode of said control tube to the control electrode of said variable load tube.

4. A cathode follower circuit for producing an electrical output signal corresponding to an applied input signal, said circuit comprising: a cathode follower tube having an anode, a control electrode for receiving the input signal, and a cathode for presenting the output signal; a variable impedance load connected to the cathode of said cathode follower tube, said load having a control element responsive to an applied control signal for varying the magnitude of the impedance of said load; and a control circuit including a control tube having an anode, a control electrode coupled to the control electrode of said cathode follower tube for receiving the input signal applied to the control electrode of the said cathode follower tube, and a cathode coupled to the cathode of said cathode follower tube, and said control circuit including means coupled to the anode of said control tube and the control element of said variable impedance load for developing said control signal and for impressing it on the control element of said impedance load.

5. In a cathode follower circuit including a cathode follower tube and a variable load therefor, said cathode follower tube having an anode, a control electrode for receiving an input signal, and a cathode for presenting an output signal, said variable load being connected to said cathode and responsive to an applied control signal for varying the load on the cathode follower tube; a control element coupled to said variable load and responsive to the input signal for producing said control signal, said control element comprising: an electron discharge device having an anode, a cathode, and a control electrode; means for applying the input signal to the control electrode of said electron discharge device; means for applying the output signal to the cathode of said electron discharge device; and means coupled to the anode of said electron discharge device and to said variable load for producing said control signal and impressing it on said variable load to vary said variable load in accordance with the signal differential between the input signal and the output signal.

6. In a cathode follower circuit including a first electron discharge tube having an anode, a cathode, and a control electrode, the anode of said first tube being connectable to the positive terminal of a direct-current voltage source; a second electron discharge tube having an anode, a cathode, and a control electrode, the anode of said second tube being connected to the cathode of said first tube, the cathode of said second tube being connectable to the negative terminal of said direct-current voltage source; and means for applying a signal between the control electrode of said first tube and the cathode of said second tube; a control circuit for controlling the impedance between the anode and the cathode of said second tube, said control circuit comprising: a third electron discharge tube having an anode, a cathode, and a control electrode, said cathode being coupled to the cathode of said first tube, said control electrode being coupled to the control electrode of said first tube; an anode impedance load having first and second ends connected to the anode of said third electron discharge tube and to said direct-current voltage source, respectively; and means for applying the signal at the anode of said third electron discharge tube to the control electrode of said second tube.

7. The cathode follower circuit defined in claim 6 wherein the last-named means includes a capacitor coupling the anode of said third electron discharge tube to the control electrode of said second tube.

8. The anode follower circuit defined in claim 6 wherein said last-named means is a direct-current coupling network coupling the anode of said third electron discharge tube to the control electrode of said second tube.

9. The cathode follower circuit defined in claim 8 wherein said direct-current coupling network includes a series circuit of first and second impedance elements having a common junction, one end of said series circuit being connected to the anode of said third electron discharge tube, the junction of said impedance elements being coupled to the control electrode of said second tube, and means for applying a biasing potential to the other end of said series circuit.

10. An electron tube network for producing an electrical output signal corresponding to an applied input signal, said network comprising: a direct-current voltage source having a positive and a negative terminal; a first tube having an anode connected to said positive terminal, a control electrode for receiving the input signal, and a cathode for presenting the output signal; a second tube having an anode connected to the cathode of said first tube, a cathode connected to the negative terminal of said voltage source, and a control electrode; a third tube having an anode for presenting a control signal, a control electrode connected to the control electrode of said first tube for receiving the input signal received by the control electrode of said first tube, and a cathode coupled to the cathode of said first tube; impedance means interconnecting said anode of said third tube to said positive terminal of said voltage source; and means for applying the control signal developed at the anode of said third tube to the control electrode of said second tube for varying the anode-to-cathode impedance of said second tube in accordance with the signal differential between the input and output signals.

References Cited in the file of this patent

UNITED STATES PATENTS

| | | |
|---|---|---|
| 2,488,567 | Stodola | Nov. 22, 1949 |
| 2,592,193 | Saunders | Apr. 8, 1952 |
| 2,613,235 | Grunsky | Oct. 7, 1952 |
| 2,700,704 | Minter | Jan. 25, 1955 |